(12) United States Patent
Rozen et al.

(10) Patent No.: US 8,402,288 B2
(45) Date of Patent: Mar. 19, 2013

(54) APPARATUS AND METHOD FOR CONTROLLING VOLTAGE AND FREQUENCY USING MULTIPLE REFERENCE CIRCUITS

(75) Inventors: Anton Rozen, Gedera (IL); Michael Priel, Hertzelia (IL); Dan Kuzmin, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 780 days.

(21) Appl. No.: 11/719,015

(22) PCT Filed: Nov. 10, 2004

(86) PCT No.: PCT/EP2004/012845
§ 371 (c)(1),
(2), (4) Date: May 10, 2007

(87) PCT Pub. No.: WO2006/050747
PCT Pub. Date: May 18, 2006

(65) Prior Publication Data
US 2008/0186083 A1 Aug. 7, 2008

(51) Int. Cl.
*G06F 1/00* (2006.01)
*G06F 17/50* (2006.01)
*G05F 1/10* (2006.01)
*G05F 3/02* (2006.01)
*G06G 7/48* (2006.01)
*G06G 7/62* (2006.01)

(52) U.S. Cl. ............ 713/300; 327/540; 327/542; 703/4; 703/13; 703/14; 703/15

(58) Field of Classification Search .................. 713/300; 703/13, 14, 15, 20, 21
See application file for complete search history.

(56) References Cited

U.S. PATENT DOCUMENTS

| 5,134,450 | A | * | 7/1992 | Tsuchiya et al. | 365/185.17 |
| 5,790,479 | A | * | 8/1998 | Conn | 368/118 |
| 5,919,264 | A | | 7/1999 | Reneris | |
| 6,157,247 | A | | 12/2000 | Abdesselem et al. | |
| 7,062,692 | B1 | * | 6/2006 | Lesea | 714/725 |
| 7,129,745 | B2 | * | 10/2006 | Lewis et al. | 326/38 |
| 2002/0005750 | A1 | | 1/2002 | Kao et al. | |

(Continued)

FOREIGN PATENT DOCUMENTS

EP 1164545 A1 12/2001
JP 11088140 A 3/1999

(Continued)

*Primary Examiner* — Kim Huynh
*Assistant Examiner* — Brandon Kinsey (57) ABSTRACT

A method and an apparatus for controlling voltage level and clock signal frequency supplied to a system. The method comprises: providing at least one reference circuit representative of a behavior of at least one estimated circuit, whereas the at least one estimated circuit includes transistors of multiple types; supplying at least one input signal to at least one reference circuits and monitoring a behavior of the at least one reference circuit one or more reference circuit; determining a characteristic of at least one output signal provided to the at least one estimated circuit; and providing at least one output signal to one or more estimated circuits The apparatus includes at least one reference circuit representative of a behavior of at least one estimated circuit, whereas the at least one estimated circuit includes transistors of multiple types; and monitoring circuitry adapted to monitor a behavior of at least one reference circuit and to determine a characteristic of at least one output signal provided to the at least one estimated circuit.

20 Claims, 4 Drawing Sheets

U.S. PATENT DOCUMENTS

| | | | |
|---|---|---|---|
| 2005/0050495 A1* | 3/2005 | McGuffin et al. | 716/5 |
| 2005/0146315 A1* | 7/2005 | Burton | 323/293 |
| 2005/0157593 A1* | 7/2005 | King et al. | 368/113 |
| 2005/0283630 A1* | 12/2005 | Shikata | 713/322 |

FOREIGN PATENT DOCUMENTS

| | | |
|---|---|---|
| JP | 2003086693 A | 3/2003 |
| WO | 9602877 A | 2/1996 |

* cited by examiner

APPARATUS AND METHOD FOR CONTROLLING VOLTAGE AND FREQUENCY USING MULTIPLE REFERENCE CIRCUITS

FIELD OF THE INVENTION

The present invention relates to apparatuses and methods for controlling supply voltage and clock signal frequency within a processor-based device.

BACKGROUND OF THE INVENTION

Mobile devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

In order to reduce the power consumption of mobile devices various power consumption control techniques were suggested. A first technique includes reducing the clock frequency of the mobile device. A second technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

The power consumption of a transistor-based device is highly influenced by leakage currents that flow through the transistor. The leakage current is responsive to various parameters including the threshold voltage (Vt) of the transistor, the temperature of the transistor, and the like. Transistors that have higher Vt are relatively slower but have lower leakage currents while transistors that have lower Vt are relatively faster but have higher leakage current.

The various transistors may also differ by the amount of current they are able to drive. Typically, input/output (I/O) circuitry includes transistors that are capable of driving relatively large current. Due to temperature changes as well as process variations the impedance of I/O transistors may vary and may result in impedance mismatch that also results in power waste.

Figure 1:
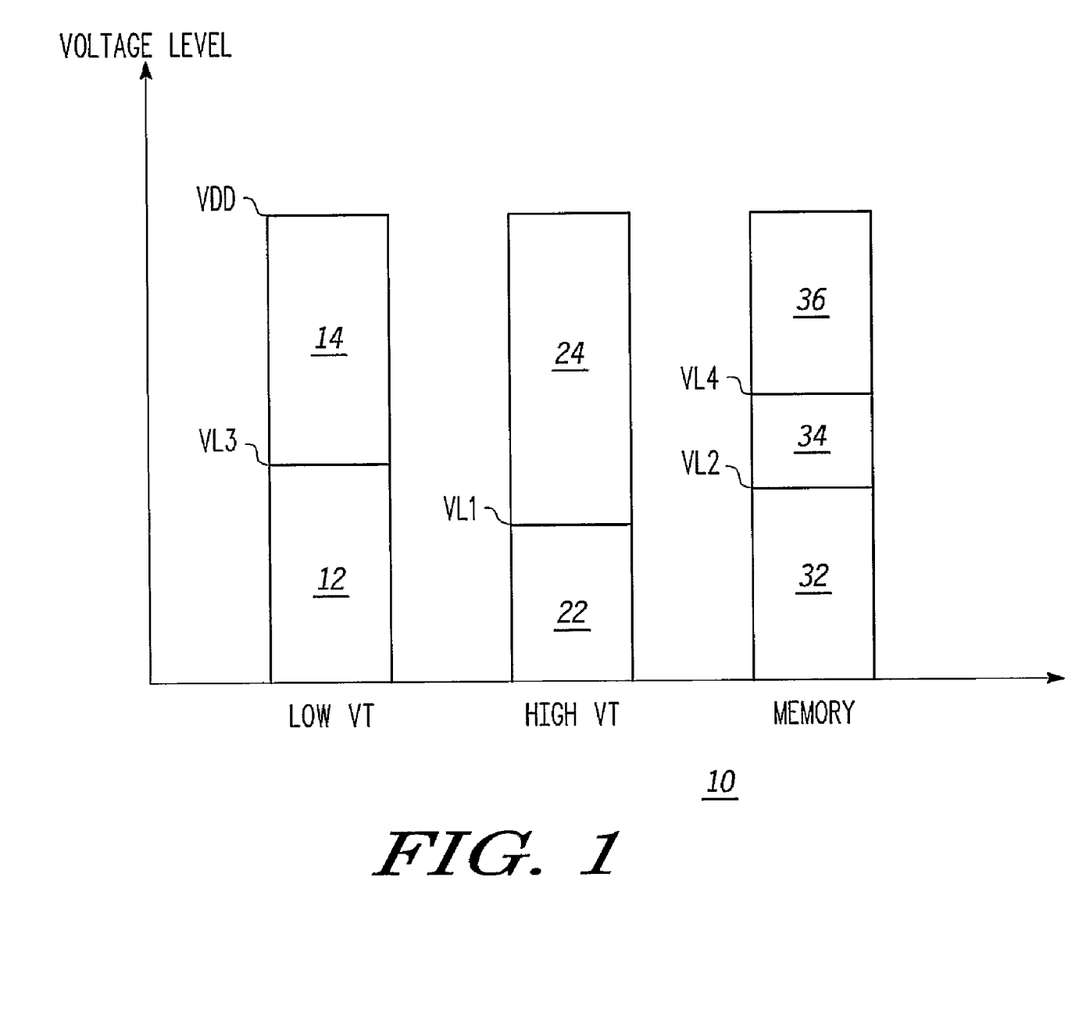
FIG. 1 illustrates the behavior of two transistor types as well as a memory circuit

FIG. 1 illustrates the behavior of two transistor types as well as a memory device. First and second voltage regions 12 and 14 describe the behavior of a typical low threshold voltage transistor. First voltage region 12 starts at about zero volts and ends at a third voltage level VL3. The second voltage region starts at VL3 and ends at a high voltage level, such as a maximal voltage level $V_{DD}$. The low threshold voltage transistors operate at the second voltage region 14, and not expected to operate at the first voltage region 12.

The third and fourth voltage regions 22 and 24 describe the behavior of a typical high threshold voltage transistor. Third voltage region 22 starts at about zero volts and ends at a first voltage level VL1. The fourth voltage region 24 starts at VL1 and ends at a high voltage level, such as a maximal voltage level $V_{DD}$.

The high threshold voltage transistors operate at the fourth voltage region 24 and are not expected to operate at the third voltage region 22.

The fifth, sixth and seventh voltage regions 32, 34 and 36 describe the behavior of a typical memory device. The fifth voltage region 32 starts at about zero volts and ends at a second voltage level VL2. The memory device must receive a voltage that exceeds VL2 in order to store information. The sixth voltage region 34 starts at VL2 and ends at a fourth voltage level VL4. The memory device must receive a voltage that exceeds VL4 in order to allow read and write operations. The seventh voltage region 36 starts at VL4 and ends at a high voltage level, such as a maximal voltage level $V_{DD}$.

The second, fourth and seventh voltage regions 14, 24 and 36 can be regarded as optimal regions as they provide a compromise between power consumption and performance. In many system transistors of various types, such as the three mentioned above types are included within a single voltage/frequency region, thus they receive the same voltage as well as the same clock signal.

It can be described, that voltage VL1 is about 0.5 volts, VL2 is about 0.6 volts, VL3 is about 0.7 volts, VL4 is about 0.9 volts and $V_{DD}$ is about 1.5 volts. It is noted that these values are provided as an example only. It is further noted that even when using the same integrated circuits as the inventors used said values might vary in response to various conditions such as temperature changes and process variations.

There is a need to provide a method and an apparatus for providing voltage and clock signals to a system that includes transistors of various types.

SUMMARY OF THE PRESENT INVENTION

The invention provides a method and an apparatus for controlling voltage level and clock signal frequency supplied to a system as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description related to a system that includes a single frequency region. It is noted that this can be applied to a system that includes multiple frequency regions. Typically, multiple frequency regions require separate control for each frequency region.

The following description also relates to three transistor types that include an I/O transistor, a low threshold transistor and a high threshold transistor. This mentioning of these three types is for convenience alone as other types of transistors can be represented by reference circuits that affect input signals (such as clock signal, supply voltage level, I/O configuration signal) supplied to various transistors within a device. For example, a system can include (and a reference circuit may represent) more than two different transistors that are characterized by more than two different threshold voltages. Yet for another example, the system can include (and a reference circuit may represent) more than a single type of transistor that differ by the amount of current they can drive.

It is further noted that although the following example refers to MOSFET transistors this is not necessarily so as transistors that are manufactured by other processes can be represented by reference circuits.

The invention monitors the behavior of one or more reference circuit and in response can determine the voltage level supplied to one or more estimated circuit, the clock signal frequency provided to one or more estimated circuit or even alter the configuration of one or more estimated circuit. Typical estimated circuits include memory modules, processors, peripherals, I/O drivers, or a portion or a part of each of the above.

The term "estimated circuit" reflects that the behavior of the estimated circuit (especially in terms of performance and power consumption) is estimated in response to the behavior of the reference circuits.

The term "transistor type" refers to a transistor that is characterized by a certain set of parameters. Transistors of different types differ from each other by at least one characteristic, such as threshold voltage or the amount of current driven by the transistor. For example, a first transistor that is characterized by a low threshold voltage is regarded a being of a different type than a transistor that is characterized by a high threshold voltage. It is noted that even transistors of the same type can have slightly different characteristics, due to various reasons including temperature difference, design, process variations and the like.

Figure 2:
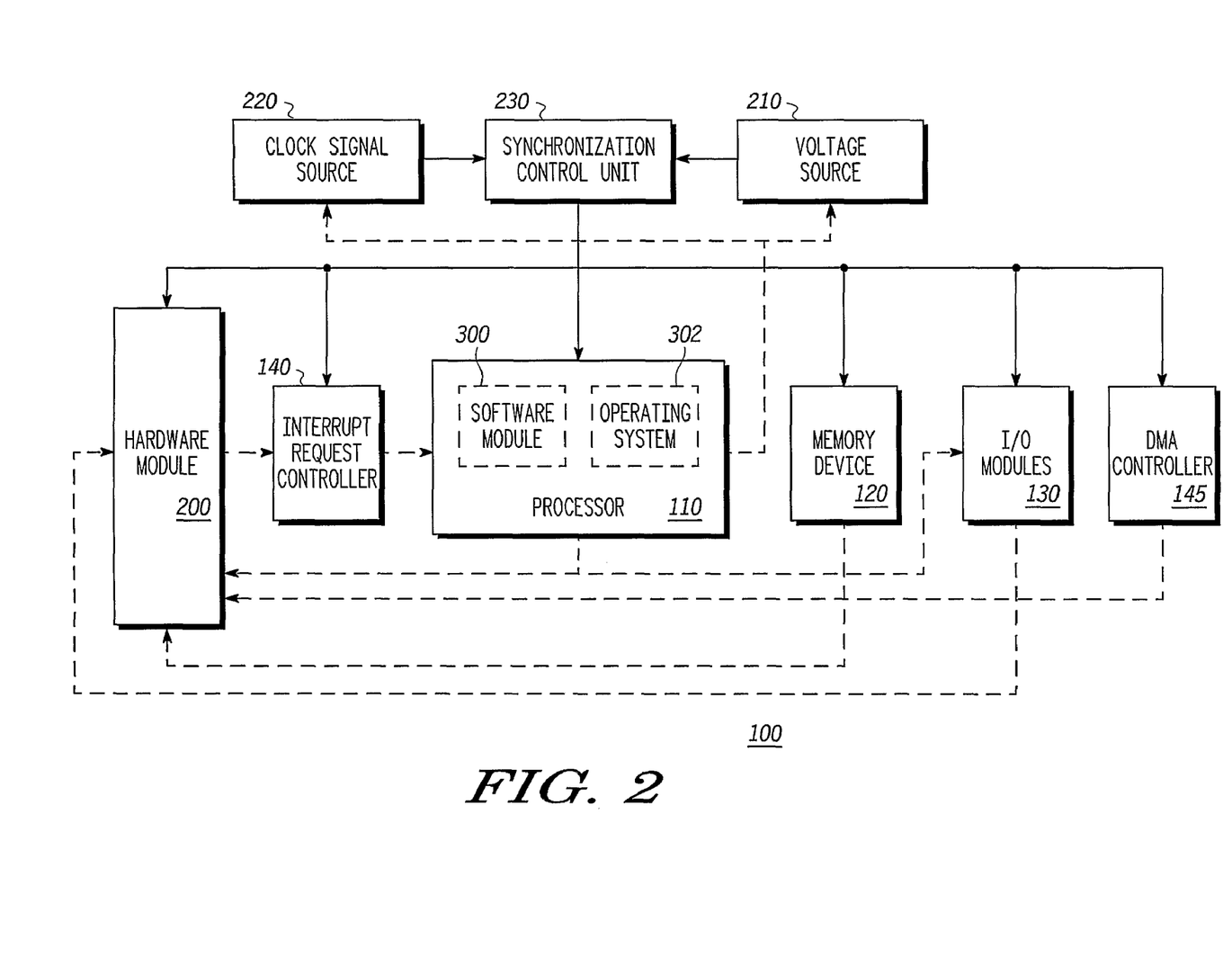
FIG. 2 illustrates an apparatus, according to an embodiment of the invention.

FIG. 2 is a schematic illustration of system 100 that includes multiple components, according to an embodiment of the invention. The components may include processor (or controller capable of executing code) 110, memory device 120, I/O modules 130, interrupt request controller 140, DMA controller 145, clock signal source 220, voltage source 210, and an optional synchronization control unit 230. System 100 also includes a hardware module 200. Conveniently, processor 110 executes a software module 300 that with the hardware module 200 forms apparatus 232. Each of said components can be an estimated circuit, depending upon the configuration of the hardware module 300 and especially depending upon the structure of the reference circuits.

According to an embodiment of the invention the software module 300 includes a voltage and clock signal source configuration module 310 that is capable of configuring the clock signal source 220 as well as the voltage source 210. Said configuration can be performed by various prior art methods, such as writing control values to registers accessed by these sources.

It is noted that when a supply voltage and clock signal are provided to an integrated circuit, their values should correspond to each other. Thus a change in clock frequency usually involves a change in the supply voltage, but this is not necessarily so. In various cases only one of said signals is changed, usually to match the value of the other signal. For convenience of explanation it is assumed that bock clock frequency and supply voltage (said pair is referred to as voltage/frequency) are altered.

The voltage and clock signal source configuration module 310 is capable of receiving requests to alter the voltage/frequency from at least one circuitry within the hardware module (usually via interrupts issued by the interrupt request controller 140) and to convert the request to a format that can be understood by and accessible to the clock signal source 220 as well as the voltage source 210.

According to another embodiment of the invention the processor 110 also executes an operation system code 300.

According to yet further embodiments the partition between hardware executed tasks and software executed tasks can change. For example more tasks, including decisions to alter a frequency/voltage can be performed by software.

The hardware module 200 is connected to the interrupt request controller 140, to processor 110 and to the synchronization control unit 230. The synchronization control unit 230 is connected to all the other components of system 100. It is further noted that some components can be connected to other components (for example—the memory device 120 can be connected to processor 110), but this is not necessarily so.

It is noted that system 100 can have various configurations and that the components illustrated in FIG. 2 represent only a single exemplary configuration of system 100. Typically, system 100 is includes within a mobile device such as a cellular phone, but it can be a part of a mobile device, a static device such as a desktop computer, and the like.

According to another embodiment of the invention the clock signal source 220 is connected to various components of system 100 and the voltage source 210 is connected to various components of system 100 while the processor 110 or even a synchronization control unit 230 send control signals to said clock signal source 220 and to the voltage source 210.

In FIG. 2 various components of system 100 are represented by boxes and multiple boxes are connected by lines to each other. For convenience of explanation only a portion of the signals exchanged between the various components are illustrated. The dashed lines represent control lines, buses or signals while the continuous lines represent clock signals, supply voltage signals or a combination of both.

System 100 receives a supply voltage $V_{DD}$ as well as a clock signal CLK of a certain frequency F from a synchronization control unit 230 that synchronizes the levels of $V_{DD}$ and F such as to prevent, for example, a case in which the supplied voltage $V_{DD}$ does not allow the system 100 to operate at the frequency F of the clock signal. The synchronization control unit 230 is connected to a clock signal source 220 for receiving the clock signal and is also connected to a voltage source 210 for receiving the supply voltage.

Conveniently, the clock signal source 220 includes two phase locked loops, whereas while one is supplying a current clock signal of a current frequency the other can be tuned to supply the next clock signal having a next frequency. The voltage source can also include two voltage sources but this is not necessarily so. It is further noted that synchronization control unit 230 can be implemented by software components, and can even be an integral part of processor 110. Only one PLL GRADUALLY CHANGE.

The hardware module 200 includes multiple reference circuits that represent various transistors and/or components within processor 110, memory device 120 and I/O module. The hardware module 200 is adapted to determine which voltage to supply to these components in response to the behavior of the reference circuits and also determine the configuration of I/O modules.

According to an embodiment of the invention the hardware module 200 includes at least one reference circuit that also provides an indication of the long conductors (also referred to as interconnects) that belong to a system such as system 10.

The inventors used an additional reference circuit that includes transistors from a certain type (for example n-type and p-type high threshold voltage transistors) in which the various stages of a ring oscillator were connected by relatively long interconnects. The addition of such a reference circuit can provide an indication of the behavior of the estimated circuits that ate least some of them are connected to long interconnects. Typically said long interconnects slow down the ring oscillator, and said effect shall be taken into account when evaluating the performance of the estimated circuits.

An I/O module usually includes multiple I/O transistors that are typically connected in parallel to each other, whereas by selectively activating one or more of said I/O transistors the impedance of said I/O module can be altered to provide a desired impedance.

According to an embodiment of the invention at least some of components of system 100 are turned off when the system 100 enters a standby state. For example, when system 100 enters a standby state hardware module 200, can be turned off.

Alternatively only a portion of hardware module 200 is activated to make sure that some components, such as memory device 120 receive at east a minimal voltage for normal operation and also minimum voltage for state retention of memory.

According to various embodiments of the invention apparatus 232 monitors the reference circuits and decide whether to alter the voltage and/or clock frequency provided to various components of system 100 constantly. According to another embodiment the monitoring is applied in a periodical manner.

According to yet a further embodiment of the invention the monitoring can be applied in response to one or more event (for example a temperature that rises to a certain level, and the like).

It is noted that said monitoring can be applied in various predetermined manners, even randomly or by a combination of both.

The apparatus 232 can be adapted to apply a first policy when deciding to increase the frequency/voltage supplied to system 100 and a second policy that conveniently differs from the first policy, when deciding to decrease the voltage/frequency supplied to system 100. It is noted that apparatus 232 can apply various policies, even the same or substantially the same policies, when deciding to increase or decrease the supplied voltage/frequency.

According to an embodiment of the invention even if a single reference circuit indicates that the frequency/voltage should be increased (for example for preventing performance degradation) than said voltage/frequency is increase, whereas the voltage/frequency can be lowered only if all reference circuits indicate that such decrement can be preformed.

Conveniently, applying different voltage/frequency increment and decrement policies are implemented, for example, by assigning different priorities to requests to increase or requests to decrease the supplied frequency/voltage.

The hardware module 200 includes reference circuits as well as decision related components, and is connected to interrupt request controller 140 for generating interrupts that can trigger a change in the supplied frequency/voltage. As mentioned above, some of the decision related tasks could be implemented by software.

The decision related components of the hardware module 200 and optionally processor 100 or even the interrupt request controller 140 can be regarded as the monitoring circuitry.

The software module 300, usually in response to an interrupt request, configures the voltage source 210 and the clock signal source 220. The control of the voltage source 210 and clock signal source 220 is relatively simple and does not load the processor 110. Furthermore, its simplicity allows components having limited processing capabilities, such as DMA modules and simple controllers, to execute the voltage and clock signal source configuration schemes.

In addition, various existing processors have the capability of setting voltage and clock signal frequency, thus utilizing this capability further increases the efficiency of apparatus 232 and system 100 as a whole.

Figure 3:
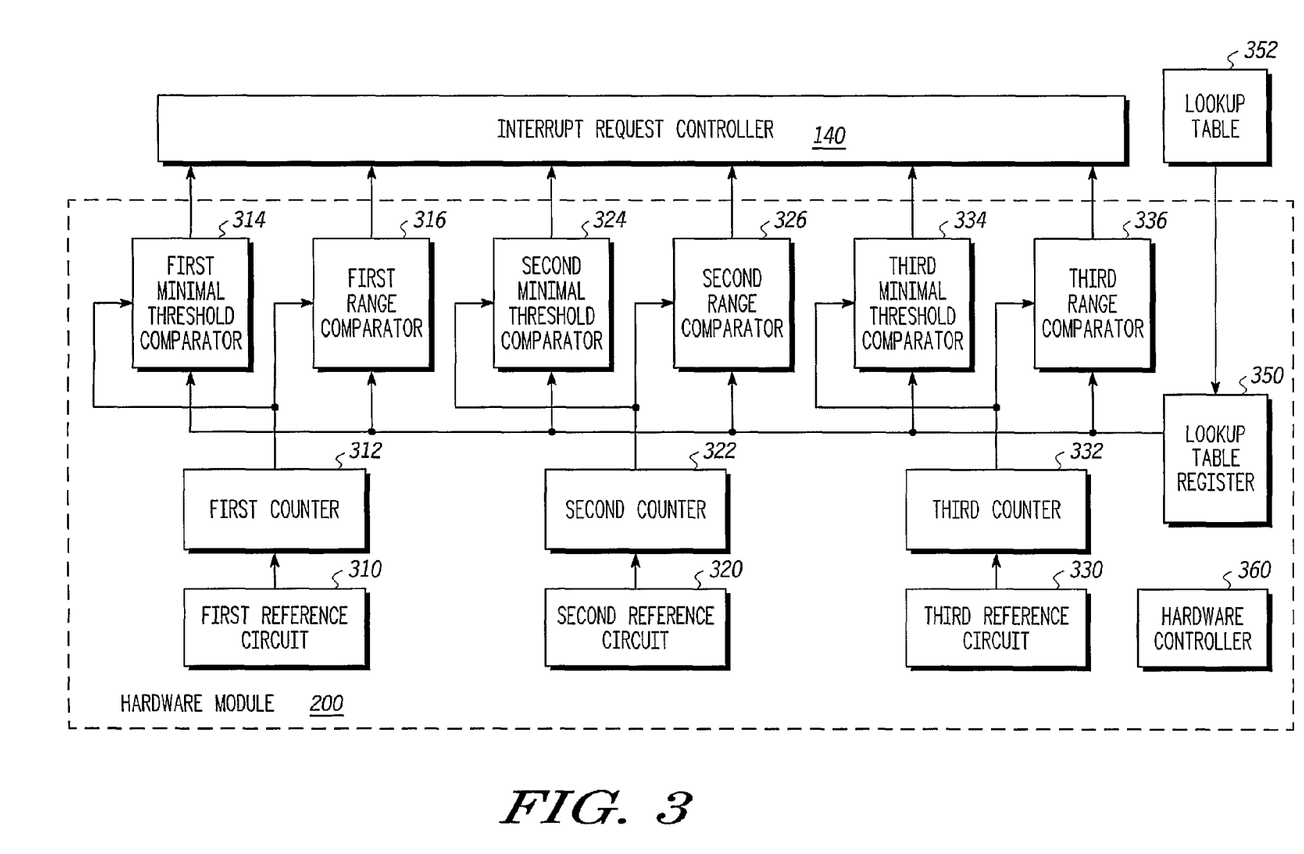
FIG. 3 is a schematic diagram of various modules of an apparatus, according to an embodiment of the invention.

FIG. 3 illustrates various components of hardware module 200, according to an embodiment of the invention.

Hardware module 200 includes multiple reference circuits, each usually includes a certain types of transistors. For convenience of explanation only three reference circuits are illustrated. It is assumed that each reference circuit includes transistors of the same characteristics (such as threshold voltage, fan out and the like), although each reference circuit typically includes both n-type and p-type transistors.

The hardware module 200 measures the delay of each transistor type and in response determines the impedance of an module such as an I/O module or determines whether to alter the voltage/frequency of supplied signals.

The inventors used a reference circuit that includes a ring oscillator and a counter for counting the amount of oscillations per a certain measurement period, but the speed of the transistors can be measured in other manners, for example by a phase detectors.

The hardware module 200 also assists in determining a configuration of at least one I/O module. The oscillation period of a ring oscillator is responsive to the capacitance of the transistors that form the ring as well as their impedance. By measuring the oscillation period of the ring oscillator the hardware module 200 can estimate the impedance of I/O transistors and in response determine which transistors within an I/O module to activate. Smaller delays are usually associated with smaller impedance.

Hardware module 200 includes a hardware controller 360, a lookup table register 350, three reference circuits 310, 320 and 330, three counters 312, 322 and 332, three minimal threshold comparators 314, 324 and 334 and three range comparators 316, 326 and 336. The hardware controller 360 controls the components of the hardware module 200 and can, for example, initiate a measurement session, end such a session and the like.

The lookup table register 350 receives a minimal threshold value for each of the three reference circuits, as well as high and low thresholds for each of the reference circuits. It is noted that a low range threshold can be equal to the low range threshold, but this is not necessarily so.

It is further noted that one or more thresholds can be responsive to an expected behavior of transistors of more than a single type and can reflect the behavior of modules, not just the behavior of single transistors.

The lookup table register 350 receives the thresholds from a lookup table 352 that is programmed before the measurement session starts. The lookup table can reflect an expected behavior at various temperature, voltage and clock signal conditions.

The lookup table 352 can be accessed by providing measured temperature values, supply voltage values, clock frequency and the like.

Referring back to FIG. 1, assuming that the first reference circuit 310 reflects the behavior of high Vt transistors, than the lower threshold as well as the minimal threshold can be set to the amount of counts that is expected when a voltage of VL1 is supplied to a high Vt transistor. The high threshold can reflect the expected count when VL5 is provided to such a transistor.

If a count of any counter reaches the minimal threshold of that counter then a high priority request to increase the provided voltage is sent to the processor 110 by means of an interrupt request.

The first reference circuit 310 is connected to first counter 312. The first counter 312 counts the oscillations of the first reference circuit 310 during a certain period and sends the count to the first minimal threshold comparator 314 and to the first range comparator 315. They compare this count to the thresholds they receive from the lookup table register 350 and determine whether to request to raise the supplied voltage, to lower it or not to alter it at all.

These comparators can also provide an indication of the amount of requested change, usually in response to the difference between one or more thresholds and the received count. The second reference circuit 320, the second counter 322, the second minimal threshold comparator 324 and the second range comparator 326 are connected to each other and interact with each other as the first reference circuit 310, the first counter 312, the first minimal threshold comparator 314 and the first range comparator 315. The same goes for the third reference circuit 330, the third counter 332, the third minimal threshold comparator 334 and the third range comparator 336.

It is noted that FIG. 3 illustrated a lookup table and a lookup table register. According to other embodiments of the invention other means for providing a parameter that reflects an expected behavior of a reference circuit can be provided. For example, the expected behavior can be represented by a mathematical function, the lookup table can be stored within a single storage component and the like.

Figure 4:
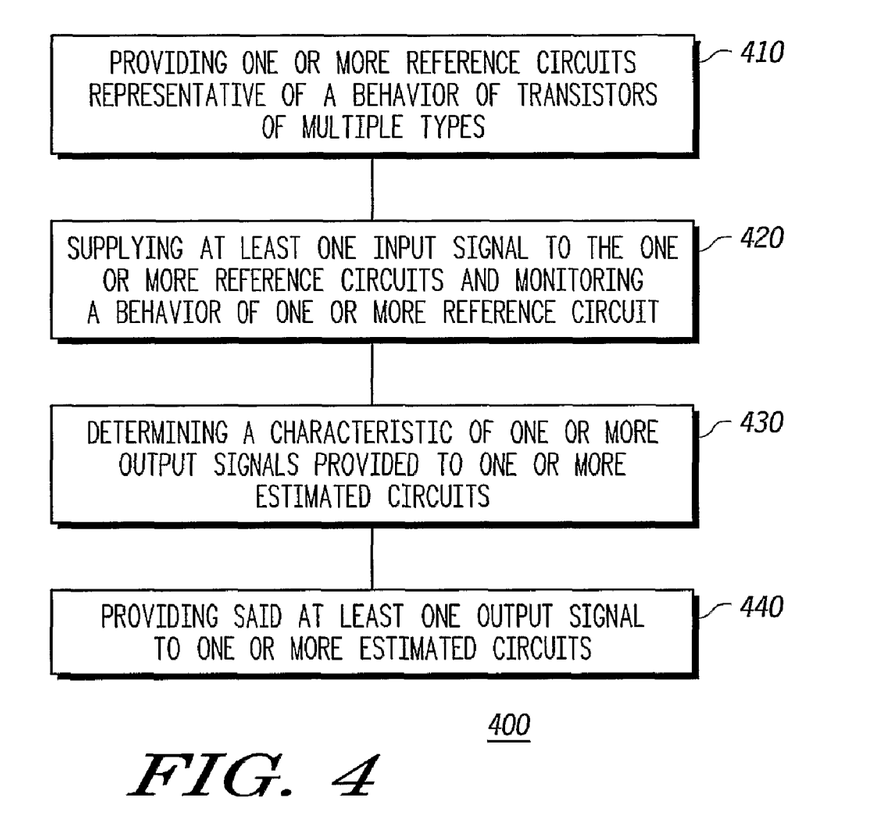
FIG. 4 is a flow chart of a method, according to an embodiment of the invention.

FIG. 4 is a flow chart of a method 400 for controlling voltage level and clock signal frequency supplied to a system that includes transistors of multiple types. Whereas transistors of different types differ by at least one characteristic such as but not limited to threshold voltage and impedance.

Method 400 starts by stage 410 of providing one or more reference circuits representative of a behavior of transistors of multiple types. Thus, a single reference circuit can represent the behavior of transistors of one or more different types. The reference circuits provide an indication about the behavior of various estimated circuits that are within a frequency region of a system such as an integrated circuit.

Stage 410 is followed by stage 420 of supplying at least one input signal to the one or more reference circuits and monitoring a behavior of one or more reference circuit. It is noted that if multiple reference circuits exist only some can be monitored. Conveniently, the at least one input signal is a voltage supply signal that is supplied to the estimated circuits. If, for example, the delay associated with certain transistors is evaluated using a phase detector than said phase detector also receives a clock signal. It is noted that various counters, comparators and logic used to monitor said behavior can receive a clock signal. The clock frequency of this clock signal can differ than the clock signal provided to the estimated circuit, but this is not necessarily so. Providing a lower frequency clock signal to the monitoring circuits can reduce the power consumption of the monitoring components. According to various embodiments of the invention stage 420 and sequence 420-450 can be initialized in various manners. They can be executed constantly, in a periodical manner, in response to one or more events, in a predetermined manner, randomly or in a combination of both.

Stage 420 is followed by stage 430 of determining a characteristic of one or more output signals provided to one or more estimated circuits. An output signal can be a clock signal and the characteristic can be the clock frequency. Another output signal can be a voltage supply signal and the characteristic is the voltage level. Yet a further output signal can determine a configuration of an I/O module, such as to substantially achieve a desired impedance.

According to an embodiment of the invention said determining includes comparing a monitored parameter to one or more expected parameters, such as one or more thresholds.

Conveniently, the determining includes applying a first policy for increasing the voltage level and/or clock signal frequency and applying a second policy for decreasing the voltage level and/or clock signal frequency.

According to an embodiment of the invention a request to increase the supplied voltage and/or clock frequency is generated if even only a single reference circuit indicates that the performance of the system can be hampered. Conveniently, a reduction of supplied voltage and/or clock frequency shall be initiated only if all reference circuits indicated that such a reduction is tolerable.

Stage 430 is followed by stage 440 of providing said at least one output signal to one or more estimated circuits. It is noted that these one or more input signals can be provided to non-estimated circuits within a frequency region and that different components can receive different output signals. For example, a control signal can be provided only to an I/O module.

According to an embodiment of the invention the monitoring includes measuring a delay of a reference circuit such as a reference circuit that includes a ring oscillator made of transistors of one or more types. Thus, PMOS transistors and NMOS transistors that have substantially the same threshold voltage and can drive substantially the same amount of current can form a single ring oscillator.

Stage 440 of providing may include configuring a supply source and a clock signal source.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for controlling voltage level and clock signal frequency supplied to a system, the method comprising:
   providing at least one output signal to multiple estimated circuits;
   providing at least one input signal to multiple reference circuits representative of a behavior of the multiple estimated circuits, whereas at least one estimated circuit comprises transistors of multiple types; wherein each of the multiple reference circuits represents a behavior of a single type of transistor, the multiple reference circuits belong to a hardware module that is coupled to the multiple estimated circuits, transistors of different types differ from each other by at least one characteristic out of: a threshold voltage and an amount of current driven by the transistor;
   monitoring a behavior of the multiple reference circuits in response to the at least one input signal;
   determining a characteristic of at least one output signal provided to the multiple estimated circuits; and
   increasing the voltage level and the clock signal frequency if only a single reference circuit of the multiple reference circuits indicates that the voltage level and the clock signal frequency should be increased based on the characteristic of the at least one output signal;
   decreasing the voltage level and the clock signal frequency if all reference circuits indicate that the voltage level and the clock signal frequency can be decreased based on the characteristic of the at least one output signal.

2. The method according to claim 1 wherein the monitoring comprises evaluating a delay of a transistor of a certain type.

3. The method according to claim 1 comprising evaluating an impedance of an input/output transistor of a ring oscillator and determining which transistors of an input/output module to activate to provide a desired impedance of the input/output module.

4. The method according to claim 1 wherein the transistors of different types differ by their threshold voltage.

5. The method according to claim 1 wherein the transistors of different types differ by an amount of current they drive.

6. The method according to claim 1 whereas the determining comprises applying a first policy for increasing the voltage level and clock signal frequency and applying a second policy for decreasing the voltage level and clock signal frequency.

7. The method according to claim 1 wherein the monitoring is executed by a hardware module.

8. The method according to claim 1 wherein the providing comprises configuring a supply source and a clock signal source.

9. An apparatus for controlling voltage level and clock signal frequency supplied to a system, the apparatus comprises:
a monitoring circuitry;
multiple reference circuits representative of a behavior of at least one of multiple estimated circuits, whereas the at least one of the multiple estimated circuits comprises transistors of multiple types; wherein each of the multiple reference circuits represents a behavior of a single type of transistor, the multiple reference circuits belong to a hardware module that is coupled to the multiple estimated circuits, and transistors of different types differ from each other by at least one characteristic out of: a threshold voltage and an amount of current driven by the transistor;
whereas the monitoring circuitry is adapted to monitor a behavior of at least one of the multiple reference circuits and to determine a characteristic of at least one output signal provided to the at least one of the estimated circuits; and
whereas the apparatus is adapted to increase the voltage level and the clock signal frequency if only a single reference circuit of the multiple reference circuits indicates that the voltage level and clock signal frequency should be increased based on the characteristic of the at least one output signal, and to decrease the voltage level and the clock signal frequency if all reference circuits indicate that the voltage level and clock signal frequency can be decreased based on the characteristic of the at least one output signal.

10. The apparatus according to claim 9 wherein the monitoring circuitry is adapted to evaluate a delay of a transistor of a certain type.

11. The apparatus according to claim 9 wherein the monitoring circuitry is adapted to evaluate an impedance of an input/output transistor of a certain type that belong to a ring oscillator and determine which transistors of an input/output module to activate to provide a desired impedance of the input/output module.

12. The apparatus according to claim 9 wherein the transistors of different types differ by their threshold voltage.

13. The apparatus according to claim 9 wherein the transistors of different types differ by an amount of current they drive.

14. The apparatus according to claim 9 whereas the monitoring circuitry is adapted to apply a first policy for increasing the voltage level and clock signal frequency and to apply a second policy for decreasing the voltage level and clock signal frequency.

15. The apparatus according to claim 9 further adapted to control a supply source and a clock signal source.

16. The apparatus according to claim 9, wherein at least one reference circuit comprises transistors of a certain type that are arranged to form a ring oscillator, wherein various stages of the ring oscillator are coupled by long interconnects.

17. The apparatus according to claim 9, wherein each of the multiple reference circuits comprises a ring oscillator and a counter for counting an amount of oscillations of the ring oscillator.

18. The apparatus according to claim 17, wherein the counter is coupled to a minimal threshold comparator and to a range comparator that are arranged to compare a value of the counter to a minimal threshold and to at least one range threshold, to provide a result, and to send a request related to a voltage level and a frequency of a clock signal in response to the result.

19. The method according to claim 1 further comprising:
receiving, at a lookup table register, a minimal threshold value for an expected parameter of the at least one of the multiple reference circuits.

20. The apparatus according to claim 9, further comprising:
a lookup table register coupled to the monitoring circuitry, the lookup table register to receive a minimal threshold value for an expected parameter of the at least one of the multiple reference circuits.

* * * * *